(12) United States Patent
Kreutzberg

(10) Patent No.: US 7,338,192 B2
(45) Date of Patent: Mar. 4, 2008

(54) HEADLIGHT FIXING DEVICE

(75) Inventor: Wilhelm Kreutzberg, Peine (DE)

(73) Assignee: Decoma (Germany) GmbH, Sulzbach (DE)

( * ) Notice: Subject to any disclaimer, the term of this patent is extended or adjusted under 35 U.S.C. 154(b) by 183 days.

(21) Appl. No.: 11/139,723

(22) Filed: May 27, 2005

(65) Prior Publication Data

US 2005/0270790 A1    Dec. 8, 2005

(30) Foreign Application Priority Data

May 27, 2004    (DE)    ...................... 10 2004 026 881

(51) Int. Cl.
F21V 19/02    (2006.01)
(52) U.S. Cl. ...................... 362/523; 362/289; 362/418; 362/549
(58) Field of Classification Search ................ 362/285, 362/289, 371, 457, 523, 549, 273, 418, 422, 362/424, 524, 528
See application file for complete search history.

(56) References Cited

U.S. PATENT DOCUMENTS

| | | | |
|---|---|---|---|
| 5,428,519 A * | 6/1995 | Salmon et al. | ............... 362/549 |
| 5,788,363 A | 8/1998 | Kamaya et al. | |
| 6,079,852 A * | 6/2000 | Kamaya et al. | ............. 362/371 |

2003/0070277 A1    4/2003    Jung

FOREIGN PATENT DOCUMENTS

| | | |
|---|---|---|
| DE | 4311419 | 10/1994 |
| DE | 198 18 791 A1 | 10/1999 |
| DE | 102 34 225 A1 | 2/2004 |
| DE | 10 2004 005 978 A1 | 9/2005 |
| EP | 1 346 874 A1 | 9/2003 |
| JP | 2003-063446 | 3/2003 |
| JP | 2003-341551 | 12/2003 |

OTHER PUBLICATIONS

English Abstract of DE 102 34 225 A1 (Cover Page of 20 2004/012961 A1).
English Abstract of JP 2003-341551.
English Abstract of JP 2003-063446.
English Abstract of EP 1 346 874 A1.
English Abstract of DE 4311419.
English Abstract of DE 198 18 791 A1.
English Abstract of DE 10 2004 005 978 A1.

* cited by examiner

Primary Examiner—Stephen F. Husar
(74) Attorney, Agent, or Firm—Clark Hill PLC

(57) ABSTRACT

A fixing device is provided for fixing a headlight to a motor vehicle. The fixing device includes means for holding a headlight housing. The fixing device also includes means for mounting the fixing device on a part of the vehicle. The means for mounting the fixing device is constructed so that the fixing device is adjustable relative to the part of the vehicle in at least one direction before being secured to the part of the vehicle.

15 Claims, 1 Drawing Sheet

HEADLIGHT FIXING DEVICE

FIELD OF THE INVENTION

The invention relates to a fixing device for fixing a headlight to a motor vehicle.

DESCRIPTION OF RELATED ART

In motor vehicles, headlights for dipped beam, high beam or the like are usually mounted in a front part of the vehicle, e.g. by being fixed to a front end mounting support or similar support structure. The headlight is fixed to the mounting support by a conventionally known screw fixing. When the headlight is fixed in this manner, it is important that the headlight is fixed in the correct position to ensure, for example, correct alignment of the beam of light produced by the headlight onto the road or an accurate joint between the edges of the headlight and adjacent parts of the radiator grill, front bumper or the like.

Conventional headlight fixing devices are constructed so that the headlight or its housing is screwed directly to the mounting support. In the event of over-large manufacturing tolerances of the headlight housing or mounting support, however, when mounting the headlight on the vehicle, adjustment in order to bring the headlight into a precisely predetermined position relative to the reference point system of the vehicle is very difficult. In other words, when such deviations occur, the required alignment of the headlight with the reference point system of the vehicle is not achieved. This results in an uneven pattern for the joint between an edge portion of the headlight and the mudguard, bonnet, bumper or the like. Moreover, this may even lead to incorrect alignment of the pool of light produced by the headlight on the road in front of the vehicle.

Accordingly, there is provided a fixing device for fixing a headlight to a motor vehicle that uses simple means to allow the position of the headlight to be adjusted while it is being mounted on the vehicle.

The fixing device according to the invention includes means for holding a headlight housing by which the headlight can be mounted on the fixing device. The fixing device also includes means for mounting the fixing device on a part of the motor vehicle, such as a front end of a mounting support or the like. These means are constructed so that before being finally fixed to the part of the vehicle, the fixing device is adjustable in at least one direction relative to the part of the vehicle. Thus, before the fixing device is secured in the required final position on the part of the vehicle, the fixing device can be aligned precisely with the so-called reference point system of the motor vehicle due to the adjustability of the means in order to compensate for any manufacturing tolerances in the headlight housing or in the front end of the mounting support, which might otherwise lead to incorrect positioning of the headlight relative to the reference point system.

According to one aspect of the invention, the means for mounting the fixing device on a part of the vehicle are adjustable in at least two different directions relative to the part of the vehicle. According to another aspect of the invention, the means for mounting the fixing device on a part of the motor vehicle are adjustable in all three spatial directions relative to the part of the vehicle. Thus, in the latter case, before the final fixing of the headlight to the vehicle, the position can be adjusted or corrected in directions x, y and z in space relative to the reference point system of the vehicle.

Due to the adjustability of the means for mounting the fixing device on a part of the vehicle in at least one direction, or even in all three directions in space, the headlight can be positioned on the vehicle with greater precision, irrespective of any manufacturing tolerances of the parts which are to be secured to one another. The alignment of the headlight with the reference point system of the vehicle is more accurate. As a result, the necessary dimensions of joints and gaps between an edge portion of the headlight and adjacent sections of the front part of the vehicle, such as a mudguard, bonnet, bumper or the like, can also be made more precise. Finally, the fixing device according to the invention makes it easier to mount the headlight on the vehicle or dismantle it therefrom, resulting in lower manufacturing costs as a result of shorter assembly times and greater ease of maintenance. If desired, the fixing device may be configured, in accordance with the front end of the mounting support or the adjacent bumper, so that the bumper does not have to be separately dismantled when the headlight is changed. This also makes a major contribution to the ease of maintenance of the vehicle.

According to still another aspect of the invention, the means for mounting the fixing device on a part of the vehicle may include a hollow screw or the like. Such a hollow screw cooperates, by means of its external thread, with a threaded hole formed in the fixing device and its free front end comes to abut on the part of the motor vehicle to which the fixing device is finally to be secured. Thus, the hollow screw acts as a positioning screw for setting a distance between the fixing device and the part of the motor vehicle. Moreover, the hollow screw has an inner bore running through the longitudinal direction of the hollow screw to accommodate a fixing screw which is passed through this inner bore and screwed to the part of the motor vehicle. For this purpose, a thread may be formed in the part or a screw nut may be secured thereon for receiving the fixing screw. In this way, the fixing device can be secured to the part of the vehicle at a predetermined spacing defined by the respective position of the hollow screw on the Fixing device.

To allow adjustment of the fixing device in all three directions in space, threaded holes may suitably be provided for receiving the hollow screws at correspondingly different points of the fixing device.

According to yet another aspect of the invention, the fixing device itself may be in the form of a mounting plate. A mounting plate of this kind can be adapted extremely well to a conventionally known mounting support and is correspondingly cheap to produce. Where there is the possibility of adjustment in all three directions in space, a threaded hole may be provided in a central part of the mounting plate to achieve adjustability in a z direction of the reference point system of the vehicle. When there is a suitable amount of play between the inner diameter of the hollow screw and a fixing screw to be inserted therein, engaging in a thread in or on the part of the vehicle, it is also possible to adjust the fixing device horizontally, namely in directions x and y of the reference point system of the motor vehicle. Additional threaded holes may be formed in a lateral part of the mounting plate in order to achieve adjustment in all three directions in space in the same way as described above.

According to another aspect of the invention, the means for holding the headlight housing may be in the form of a T-shaped guide groove, which cooperates accordingly with a retaining device for the headlight housing constructed in complementary fashion. Preferably, the T-shaped guide groove is formed on a surface of the mounting plate so that the headlight can readily be slid onto this guide. In addition to being easy to assemble, the weight of the headlight is absorbed by the mounting support on the vehicle, thus allowing the T-shaped guide groove to be made correspondingly smaller.

The T-shaped guide groove is expediently aligned either substantially parallel or substantially at right angles to the longitudinal direction of the vehicle when the fixing device is secured to the mounting support. Thus, the headlight housing or the headlight can easily be slid onto the T-shaped guide groove from in front or from the side until it reaches a stop, which defines or guarantees an end position of the headlight relative to the fixing device.

A subsequent adjustment of the headlight relative to the reference point system of the vehicle can still be carried out even after the headlight has been mounted on the fixing device, namely by adjusting the hollow screws relative to the mounting support and subsequently tightening the fixing screw to the mounting support. By means of this adjustment of the hollow screw or screws in the fixing device relative to the part of the vehicle or the mounting support before and/or, in this case, after the headlight housing has been mounted on the T-shaped guide groove, extremely accurate positioning of the headlight can be achieved relative to the reference point system of the vehicle.

According to an alternative embodiment of the invention the headlight housing may also be mounted directly on the mounting plate. For this, the headlight housing is integrally connected to the mounting plate, while the means for holding the headlight housing are formed by a joint between the mounting plate and the headlight housing.

According to still another aspect of the invention, the fixing device may include a fixing mechanism on which a bumper cladding or the like can be mounted. A fixing mechanism of this kind may be in the form of a C-shaped channel formed on a front edge of the mounting plate into which the bumper cladding can be inserted by one end. In this way, a very good joint can be ensured between a lower edge portion of the headlight and the adjacent bumper.

It is particularly expedient to produce the fixing device according to the invention from a metal, which results in a long service life and is particularly inexpensive. Alternatively, the fixing device could also be made of a plastic, particularly of a fibre reinforced plastic, thus ensuring adequate mechanical strength of the fixing device. Manufacturing the fixing device from plastic also ensures a high degree of integration or ease of shaping, e.g. in order to construct the T-shaped guide groove described above or to adapt to the mounting support front module of the vehicle on which the fixing device is to be mounted.

The fixing device according to the invention may be mounted on a mounting support or the like, as explained previously, which may in turn be part of a so-called front end which closes off the vehicle at the front. Thus, the fixing device according to the invention is a part of the front end. Due to the possibility of adjusting the position of the fixing device relative to the mounting support, when the front end is fixed to the vehicle chassis it is possible to allow for minor tolerances or deviations. Finally, the components which determine the joints, i.e. a headlight, bumper cladding members or the like, can be aligned precisely with the vehicle reference point system by means of the fixing device on account of its adjustability relative to the mounting support, thus ensuring precise joints between adjacent components in the outer part of the vehicle. In other words, the headlight fixing device according to the invention can also be used as a reference component aligned with the vehicle reference point system, when mounting the front end on the vehicle chassis. This has significant advantages when linking the tolerances of the various components integrated in the front end of the vehicle.

SUMMARY OF THE INVENTION

A fixing device is provided for fixing a headlight to a motor vehicle. The fixing device includes means for holding a headlight housing. The fixing device also includes means for mounting the fixing device on a part of the vehicle. The means for mounting the fixing device is constructed so that the fixing device is adjustable relative to the part of the vehicle in at least one direction before being secured to the part of the vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
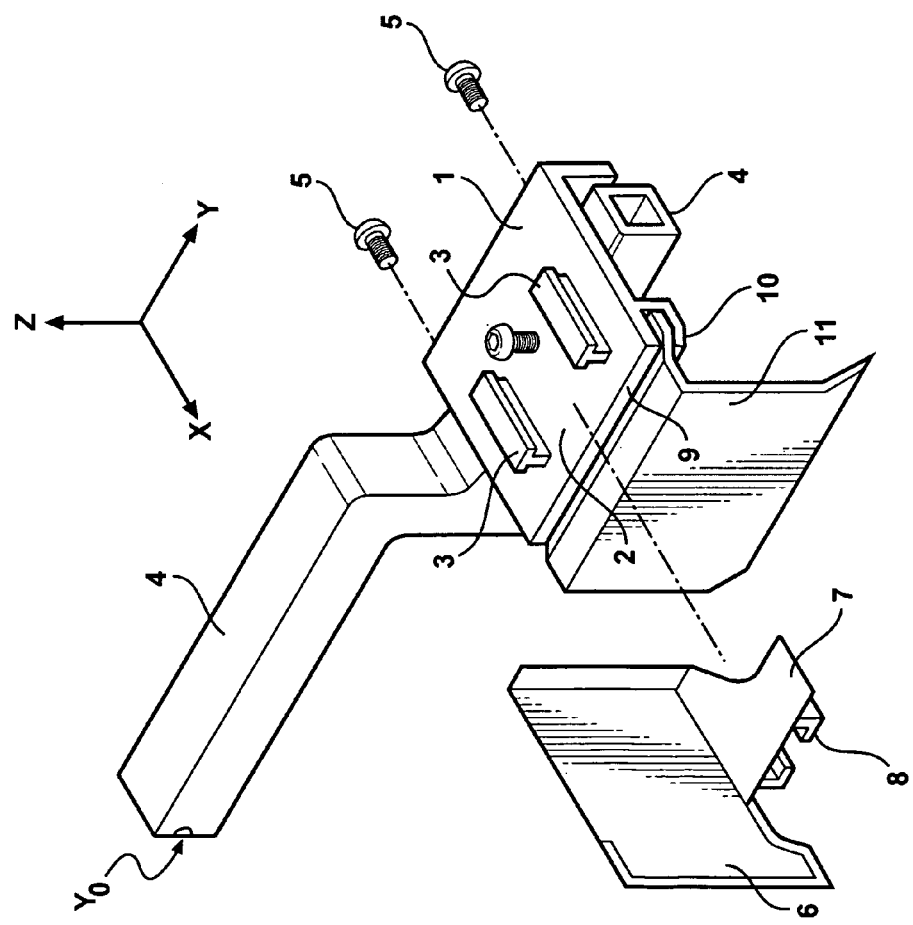
FIG. 1 is a perspective view of a fixing device according to the invention for mounting a headlight on a part of a motor vehicle.

Referring to FIG. 1, a fixing device 1 according to the invention is in the form of a mounting plate. The mounting plate 1 can be manufactured from metal or plastic, and the plastic may be fibre-reinforced in order to improve the mechanical properties of the mounting plate 1. On an upper side 2 of the mounting plate 1 is provided means for holding a headlight housing in the form of a pair of T-shaped guide grooves 3. The two T-shaped guide grooves are parallel and spaced from one another along the upper side 2. The mode of operation of the T-shaped guide grooves 3 is explained in more detail hereinafter.

The mounting plate 1 is fixed to a front end module 4, hereinafter referred to as a mounting support. For this purpose, the geometry of the mounting plate 1 is suitably adapted to the mounting support 4 and includes means for mounting thereon. The mounting plate 1 is bent at right angles along one of its edges, this angular section suitably engaging behind the square profile of the mounting support 4, as shown in FIG. 1. The means for mounting the mounting plate 1 on the mounting support 4 include hollow screws 5. Corresponding to the hollow screws 5, the mounting plate 1 includes, in a central part of the upper side 2 and in the angular section, threaded holes into which the hollow screws 5 are screwed to contact the mounting support 4 at their front ends. The hollow screws 5 have a through-bore parallel to their longitudinal axis, through which a fixing screw 14 is passed for screwing to the mounting support 4. The mode of operation of the hollow screws 5 is described in more detail with reference to FIG. 2.

The mounting support, shown in FIG. 1, extends in the transverse direction (direction y in FIG. 1) of the vehicle. The mounting plate 1, together with a headlight 6, is attached to a free end of the mounting support 4 so that the structure of the mounting support 4 is determined by the required position of the headlight 6 on the vehicle.

The mounting plate 1 is fixed to the mounting support 4 by means of the hollow screws 5. Due to the interaction between the hollow screws 5 and the fixing screws 14 inserted therein, which are screwed into the mounting support 4, the mounting plate 1 can be suitably adjusted relative to the mounting support 4 before it is finally fixed. The hollow screws 5 thus act as positioning screws which define a specific spacing of the mounting plate 1 from the mounting support 4. The mounting plate 1 is positionable in all three directions shown in FIG. 1 (directions x, y and z) by at least a few millimetres relative to the mounting support 4 in order to be able to equalise any dimensional tolerances between these components. $Y_o$ in FIG. 1 defines a main point of the vehicle reference point system (RPS), which defines a nominal reference point along the transverse and vertical axes of the vehicle. The positioning of the mounting plate 1 relative to the mounting support 4 as described hereinbefore is carried out with reference to the main point $Y_o$.

The headlight 6 includes guide rails 8 along an underside of a housing 7. The guide rails 8 are complementary to the T-shaped guide grooves 3 and are able to interact suitably therewith. The headlight 6 slidably engages the T-shaped guide grooves 3 from the front, in the direction of the longitudinal axis of the vehicle (direction x), as shown in FIG. 1, until suitable stops or the like define an end position of the headlight 6 relative to the mounting plate 1 to suitably stop the headlight 6. The mounting plate 1 in the current embodiment is horizontally fixed to the mounting support 4 so that the weight of the headlight 6 is finally supported by the mounting support 4. In other words, the T-shaped guide grooves 3 in conjunction with the guide rails 8 serve only to fix the headlight 6 substantially in directions x and y, but these elements do not have to be designed to bear the weight of the headlight 6.

On a front edge 9 of the mounting plate 1 is formed a fixing device 10 in the form of a C-shaped channel into which a bumper cladding 11 or the like can be inserted. By mounting the bumper cladding 11 on the mounting plate 1 in this way, a highly accurate joint is ensured between a lower edge of the headlight 6 and the bumper cladding 11. For this purpose, further positioning means may be provided on the T-shaped guide grooves 3 by means of which the headlight 6 can be adjusted in the x direction relative to the T-shaped guide grooves 3 in order to be able to adjust the configuration of the joint very precisely in the light of any possible manufacturing tolerances.

Figure 2:
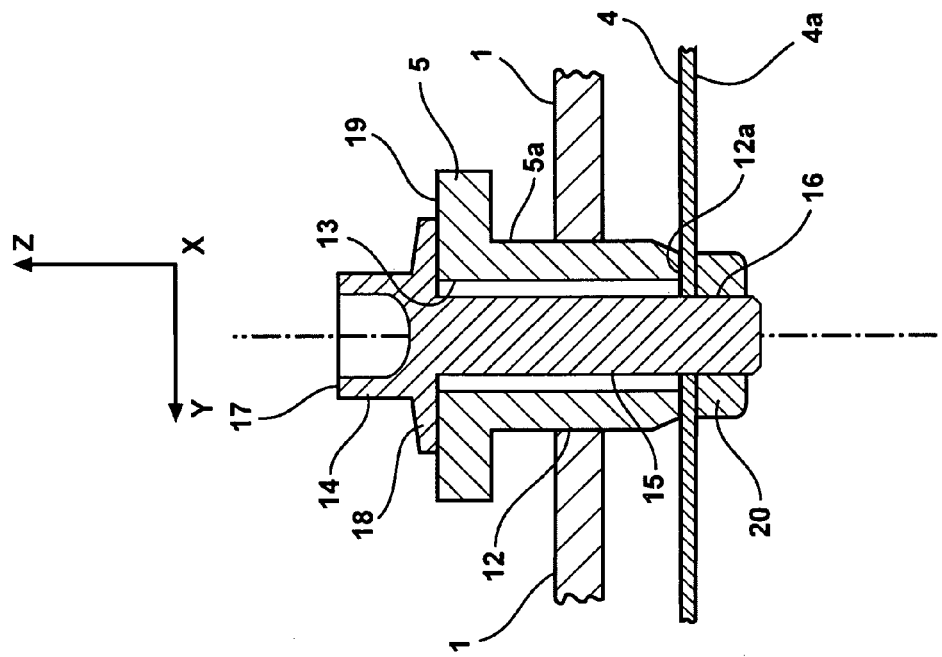
FIG. 2 is a lateral cross sectional view of a lateral hollow screw in conjunction with the fixing device.

The method of operation of the hollow screws 5 in conjunction with the mounting plate 1 and the mounting support 4 will now be described with reference to the cross-sectional view in FIG. 2.

The hollow screw 5 is threaded into a threaded hole 12 in the mounting plate 1 by means of its external thread 5a. The hollow screw 5 is screwed into the threaded hole 12 until a free front end 12a of the hollow screw 5 makes contact with a surface of the mounting support 4. Thus, the extent to which the hollow screw 5 is screwed into the threaded hole 12 in the mounting plate 1 determines the spacing of the mounting plate 1 relative to the mounting support 4 in the z direction.

The hollow screw 5 has a through-bore 13 passing longitudinally through it. This through-bore 13 to some extent forms a cylindrical channel inside the hollow screw 5. The through-bore 13 serves to accommodate the fixing screw 14, the outer diameter of a shank 15 of the fixing screw 14 or its external thread 16 being less than the internal diameter of the though-bore 13. At one end, the fixing screw 14 has a head 17 with a flange 18. The hollow screw 5 has, at its end opposite the front end 12a, a projecting flange portion 19, the diameter of which is suitably large enough to ensure that the flange 18 of the fixing screw 14 can abut thereon.

An opening is formed in a wall of the mounting support 4. Adjacent to this opening, a welded nut 20 is preferably fixed to an underside 4a of the wall of the mounting support 4, to act as a nut for the fixing screw 14. Alternatively, the opening in the wall of the mounting support 4 may itself be provided with a thread which matches the external thread 16 of the fixing screw 14.

In order to secure the mounting plate 1 to the mounting support 4 at a predetermined spacing, the hollow screw 5 is first screwed into the threaded hole 12 in the mounting plate 1 until the front end 12a of the hollow screw 5 comes to bear on a surface of the mounting support 4, thereby fixing a predetermined spacing of the mounting plate 1 relative to the mounting support 4 in the z direction. The fixing screw 14 is then inserted from above into the through-bore 13 of the hollow screw 5 and screwed into the welded nut 20. As shown in FIG. 2, before the fixing screw 14 is finally tightened, the mounting plate 1 can be suitably adjusted in the horizontal direction, i.e. in directions x and y, thanks to the play between the internal diameter of the through-bore 13 and the external diameter of the shank 15. Thus, only when the mounting plate 1 has reached its predetermined position relative to the reference point system of the vehicle is the fixing screw 14 fully tightened, so that the frictional locking between the flange 18 and the flange portion 19 fixes the hollow screw 5 and, in conjunction therewith, the mounting plate 1.

As an alternative to the principle of fixing described above using a hollow screw, other screwing or attachment means can be used in the same way to secure the mounting plate 1 suitably to the mounting support 4, while allowing previous adjustment of the position of the mounting plate 1 relative to the mounting support 4.

To summarize, the fixing of a headlight to a motor vehicle using the mounting plate 1 according to the invention will now be described.

The mounting plate 1 is first attached to the mounting support 4 by means of the hollow screws 5 and the fixing screws 14, in alignment with the vehicle RPS. For fine adjustment of the mounting plate 1 relative to the mounting support 4, the hollow screws 5 are adjusted to bear on the mounting support 4 and then the fixing screws 14 are screwed tight with the welded nuts 20. The bumper cladding 11 is then laterally inserted in the C-shaped channel 10 and aligned accordingly with the vehicle RPS. Next, the headlight 6 is pushed on to the T-shaped guide grooves 3 from the front until the headlight 6 abuts suitable latching means or the like, which secure the headlight 6 in an end position relative to the mounting plate 1. The headlight 6 can be adjusted in the x direction by means of suitable positioning means formed on the T-shaped guide grooves 3 so that the light disk can be aligned flush with the bumper cladding 11.

As an alternative to the means for holding the headlight housing 7 in the form of the T-shaped guide grooves 3 and the guide rails 8, the headlight 6 can also be mounted directly on the mounting plate 1 or integrally formed thereon, without any problem. The threaded through-holes 12 in the mounting plate 1 are then suitably positioned such that it is still possible to adjust the position of the mounting plate 1 relative to the mounting support 4.

The mounting plate 1 according to the invention allows extremely precise positioning of the headlight 6 relative to the vehicle RPS. Thus, the dimensions of the joints and gaps between the headlight 6 and adjacent parts of the bodywork or other cladding parts can be adhered to extremely precisely. Moreover, it is easier to mount and dismantle the headlight 6 in the event of damage, which makes a considerable contribution to ease of maintenance of the vehicle. Finally, the mounting plate 1 according to the invention requires a very short assembly time during manufacture, which is reflected in the lower manufacturing costs of the vehicle.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A fixing device for fixing a headlight to a motor vehicle, said fixing device comprising:
   means for holding a headlight housing; and
   means for mounting the fixing device on a part of the vehicle, said means including a hollow screw which cooperates with a threaded holder in the fixing device so that the fixing device is adjustable relative to the part of the vehicle in at least one direction before being secured to the part of the vehicle.

2. A fixing device as set forth in claim 1 wherein said means for mounting the fixing device on a part of the vehicle is such that the fixing device is adjustable relative to the part of the vehicle in at least two different directions before being fixed to the part of the vehicle.

3. A fixing device as set forth in claim 2 wherein said means for mounting the fixing device on a part of the vehicle is such that the fixing device can be adjusted relative to the part of the vehicle at least in all three spatial directions before being secured to the part of the vehicle.

4. A fixing device as set forth in claim 3 constructed in the form of a mounting plate.

5. A fixing device as set forth in claim 4 wherein the mounting plate is suitably matched to a support element of the vehicle.

6. A fixing device as set forth in claim 5 wherein the means for holding the headlight housing are in the form of a T-shaped guide groove cooperating with a complementary holding device for the headlight housing.

7. A fixing device as set forth in claim 6 wherein the T-shaped guide groove is formed on a surface of the mounting plate.

8. A fixing device as set forth in claim 7 mounted on the part of the motor vehicle such that the T-shaped guide groove extends substantially parallel or substantially transversely relative to the longitudinal direction of the vehicle.

9. A fixing device as set forth in claim 8 wherein the headlight housing is mounted on the mounting plate.

10. A fixing device as set forth in claim 9 wherein the headlight housing is integrally connected to the mounting plate, the means for holding the headlight housing being formed by a joint between the mounting plate and the headlight housing.

11. A fixing device as set forth in claim 10 including a fixing mechanism on which a bumper cladding or the like can be mounted.

12. A fixing device as set forth in claim 11 wherein the fixing means are in the form of a C-shaped channel provided on a front edge of the mounting plate.

13. A fixing device as set forth in claim 12 wherein said fixing device is formed from metal.

14. A fixing device as set forth in claim 12 wherein said fixing device is formed from plastic.

15. A fixing device as set forth in claim 14 wherein the plastic includes a fibre reinforcement.

* * * * *